US012627455B2

(12) United States Patent
Zhou et al.

(10) Patent No.: US 12,627,455 B2
(45) Date of Patent: May 12, 2026

(54) METHOD FOR DATA TRANSMISSION PROCESSING BASED ON TRANSMISSION CONFIGURATION INDICATOR AND TIMING ADVANCE AND RELATED APPARATUS

(71) Applicant: SPREADTRUM COMMUNICATIONS (SHANGHAI) CO., LTD., Shanghai (CN)

(72) Inventors: Huayu Zhou, Shanghai (CN); Sicong Zhao, Shanghai (CN); Zhenzhu Lei, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 461 days.

(21) Appl. No.: 18/249,291

(22) PCT Filed: Oct. 13, 2021

(86) PCT No.: PCT/CN2021/123444
§ 371 (c)(1),
(2) Date: Apr. 17, 2023

(87) PCT Pub. No.: WO2022/078361
PCT Pub. Date: Apr. 21, 2022

(65) Prior Publication Data
US 2023/0403122 A1 Dec. 14, 2023

(30) Foreign Application Priority Data
Oct. 16, 2020 (CN) .......................... 202011111989.5

(51) Int. Cl.
*H04L 5/00* (2006.01)

(52) U.S. Cl.
CPC .................................. *H04L 5/0091* (2013.01)

(58) Field of Classification Search
CPC ..... H04L 5/0091; Y02D 30/70; H04W 24/02; H04W 76/10; H04W 76/27
See application file for complete search history.

(56) References Cited

U.S. PATENT DOCUMENTS

| | | | |
|---|---|---|---|
| 2020/0366442 A1* | 11/2020 | You | H04L 5/0053 |
| 2022/0264617 A1* | 8/2022 | Sha | H04W 72/20 |
| 2024/0014979 A1* | 1/2024 | Lei | H04L 5/1469 |

FOREIGN PATENT DOCUMENTS

| | | |
|---|---|---|
| CN | 104094548 A | 10/2014 |
| CN | 109548133 A | 3/2019 |

(Continued)

OTHER PUBLICATIONS

Asustek, Discussion on TA timer for D-PUR, 3GPP TSG-RAN WG2 Meeting#106, R2-1906551, May 17, 2019.

(Continued)

*Primary Examiner* — Walli Z Butt
(74) *Attorney, Agent, or Firm* — HAUPTMAN HAM , LLP

(57) ABSTRACT

Disclosed are a method for data transmission processing and related apparatuses, the method for data transmission processing and related apparatuses are applied to a user equipment (UE). The method includes: determining validity of a transmission configuration indicator (TCI) and a timing advance (TA).

17 Claims, 1 Drawing Sheet

(56)                    References Cited

FOREIGN PATENT DOCUMENTS

| | | | |
|----|-----------|---|---------|
| CN | 110034874 | A | 7/2019 |
| CN | 110474751 | A | 11/2019 |
| CN | 110536470 | A | 12/2019 |
| CN | 110536471 | A | 12/2019 |
| CN | 111278092 | A | 6/2020 |
| CN | 111294928 | A | 6/2020 |

OTHER PUBLICATIONS

ZTE, Support for transmission in preconfigured UL resources for NBIoT, 3GPP TSG RAN WGI Meeting#98b, R1-1910272, Oct. 18, 2019.
WIPO, International Search Report and Written Opinion for International Application No. PCT/CN2021/123444, Jan. 14, 2022.
First Office Action issued in corresponding CN application No. 202011111989.5 dated Mar. 12, 2024.
Notification of grant of patent right for invention issued in corresponding CN application No. 202011111989.5 dated Oct. 24, 2024.

* cited by examiner

DETERMINE VALIDITY OF A TCI AND A TA    S101

MONITOR A TYPE-1 PDCCH OR TRANSMITTING DATA ON A PUR, IF THE TCI AND THE TA ARE DETERMINED TO BE VALID    S102

UE 200

PROCESSOR 210

COMMUNICATION INTERFACE 230

MEMORY 220

ONE OR MORE PROGRAMS 221

300

APPARATUS FOR DATA TRANSMISSION PROCESSING

PROCESSING UNIT    301

COMMUNICATION UNIT    302

STORAGE UNIT    303

METHOD FOR DATA TRANSMISSION PROCESSING BASED ON TRANSMISSION CONFIGURATION INDICATOR AND TIMING ADVANCE AND RELATED APPARATUS

CROSS-REFERENCE TO RELATED APPLICATION(S)

This application is a National Stage of International Application No. PCT/CN2021/123444, field Oct. 13, 2021, which claims priority to Chinese Patent Application No. 202011111989.5, filed Oct. 16, 2020, the entire disclosure of which are hereby incorporated by reference.

TECHNICAL FIELD

This disclosure relates to the field of communication technology, and in particular, to a method for data transmission processing and related apparatuses.

BACKGROUND

Heartbeat traffics generally mean that clients transmit application-layer messages to servers to indicate to the servers that current services are active. Generally speaking, the heartbeat traffic is a small data packet service with a long period, where the long period means that the message transmission can be performed once every few minutes, and the small data packet means that a data packet transmitted once is relatively small, such as hundreds or thousands of bytes. In the internet of things (IOT) or some wearable-device scenarios, the heartbeat traffic is a relatively common service for the sake of power saving and typical application requirements. Since the heartbeat traffic is a small data packet service with a long period, the user equipment (UE) does not need to transmit a scheduling request (SR) to apply for uplink grant from the network, and the UE obtains the uplink grant by monitoring a physical downlink control channel (PDCCH) on a configured PDCCH monitoring occasion (MO), so that the SR can be omitted, and power consumption of the UE can be reduced.

Generally, the UE in a connected state needs to monitor a PDCCH for a heartbeat traffic. In an idle state or an inactive state, data of the heartbeat traffic may be implemented by reserving a PDCCH configuration for the heartbeat traffic in the connected stat. In other words, the UE still monitors, in the idle state or the inactive state, the PDCCH for the heartbeat traffic configured in the connected state, so that the UE may receive an uplink grant and transmit uplink data. When the UE is in the connected state, the network may indicate beam information through unicast signaling, that is, the network can ensure transmission reliability through a transmission configuration indicator (TCI) or a timing advance (TA). However, when the UE falls back to the idle state or the inactive state, it is difficult for the network to ensure transmission reliability through the TCI or the TA. Therefore, the UE needs to determine whether the current TCI and TA are valid.

SUMMARY

In a first aspect, a method for data transmission processing is provided in implementations of the disclosure. The method is applicable to the UE and the method includes: determining validity of a TCI and/or a TA.

In a second aspect, a UE is provided in implementations of the disclosure. The UE includes a processor, a memory, a communication interface, and one or more programs. The one or more programs are stored in the memory. The one or more programs are configured to be executed by the processor and include instructions configured to perform the operations in the first aspect of implementations of the disclosure.

In a third aspect, a non-transitory computer-readable storage medium is provided in implementations of the disclosure. The computer-readable storage medium stores computer programs for electronic data interchange (EDI), where the computer programs are operable with a computer to perform part or all of the operations described in the first aspect of implementations of the disclosure.

BRIEF DESCRIPTION OF THE DRAWINGS

To describe technical solutions in implementations of the disclosure or the related art more clearly, the following will give a brief introduction to accompanying drawings required for describing implementations or the related art. Apparently, the accompanying drawings hereinafter described are merely some implementations of the disclosure. Based on these accompanying drawings, those of ordinary skill in the art can also obtain other drawings without creative effort.

DETAILED DESCRIPTION

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other operations or units that are not listed; alternatively, other operations or units inherent to the process, method, product, or device can be included either.

The term "implementation" referred to herein means that a particular feature, structure, or feature described in conjunction with the implementation or embodiment may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

To facilitate better understanding of solutions of the disclosure by those skilled in the art, the technical solutions in implementations of the disclosure are clearly and completely described hereinafter with reference to the accompanying drawings in the implementations of the disclosure. Apparently, the described implementations are merely part of rather than all of the implementations of the disclosure. All other implementations obtained by those of ordinary skill in the art based on the implementations provided herein without creative efforts shall fall within the scope of the disclosure.

A user equipment (UE) described in implementations of the disclosure may include a smart phone (such as an Android® phone, an iOS® phone, or a Windows® Phone), a tablet computer, a palmtop computer, a notebook computer, a video matrix, a monitoring platform, a mobile internet device (MID), a wearable device, etc. The above is only an example and not an exhaustive list, and the UE includes, but is not limited to, the above apparatuses. The above UE may also be a user device, such as a cloud user device.

The following will describe in detail implementations of the disclosure.

Figure 1:
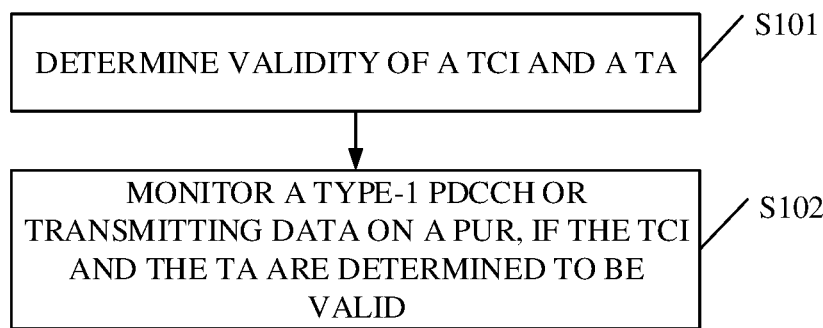
FIG. 1 is a schematic flowchart illustrating a method for data transmission processing provided in implementations of the disclosure.

FIG. 1 is a schematic flowchart illustrating a method for data transmission processing provided in implementations of the disclosure, where the method for data transmission processing is applied to a UE. As illustrated in FIG. 1, the method for data transmission processing includes the following.

S101, determine validity of a transmission configuration indicator (TCI) and a timing advance (TA).

When the UE is detected to be switched from a connected state to an idle state or an inactive state, validity of a current TCI and a current TA needs to be determined.

The TCI is the last TCI indicated by a signaling before the UE is released from the connected state, or a TCI indicated by the latest idle state message (such as message 2 or message 4). The TCI may also be referred to herein as a TCI state.

S102, monitor a type-1 physical downlink control channel (PDCCH) or transmit data on a predefined uplink resource (PUR), if the TCI and the TA are determined to be valid. The type-1 PDCCH is a PDCCH for a heartbeat traffic.

A base station may configure a dedicated PDCCH for the heartbeat traffic, to schedule data transceiving of the heartbeat traffic. The PDCCH is generally configured through a search space set, and thus in fact, the base station may configure a search space set for the heartbeat traffic, and a PDCCH candidate in the search space set may be regarded as the type-1 PDCCH. The type-1 PDCCH described herein may also be equivalent to a type-1 search space set. whether the PDCCH or the search space set is for the heartbeat traffic may be represented by a parameter in higher-layer parameters of the search space set, that is, whether the PDCCH or the search space set is for the heartbeat traffic is identified by an information element. That is to say, the PDCCH for the heartbeat traffic can be distinguished from other PDCCHs (also referred to as other search space sets other than the type-1 search space set) through a parameter in the higher-layer parameters of the search space set. In the disclosure, the PDCCH for the heartbeat traffic is classified as the type-1 PDCCH.

The PUR is a data resource. The UE can transmit data on the PDU without obtaining an uplink grant. That is to say, the UE can transmit data on the PDU without monitoring the type-1 PDCCH or other PDCCHs.

If the UE determines that the current TCI and the current TA are valid, the UE continues to use the type-1 PDCCH, that is, the UE continues to monitor the type-1 PDCCH, or transmits data on the PDU.

It can be seen that the method for data transmission processing and related apparatuses described in implementations of the disclosure are applied to the UE. The UE determines validity of the TCI and the TA, and if the UE determines that the TCI and the TA are valid, the UE monitors the type-1 PDCCH or transmits data on the PDU. By means of classifying the PDCCH for the heartbeat traffic as the type-1 PDCCH, when the UE is detected to fall back to the idle state or the inactive state, whether to continue to monitor the type-1 PDCCH or to transmit data on the PDU is determined according to validity of the TCI and the TA, which helps to ensure the reliability of data transmission of the heartbeat traffic.

In a possible implementation, the method further includes falling back to a random access process or a small data packet transmission process, if at least one of the TCI or the TA is determined to be invalid.

If the UE determines that at least one of the current TCI or the current TA is invalid, the UE falls back to the random access process. During the random access process, the UE can obtain a new TCI and a TA in the second step of the four-step random access, i. e., the UE can obtain a new TCI and a TA from message 2; or the UE can obtain a new TCI and a TA in the fourth step of the four-step random access, i. e., the UE can obtain a new TCI and a TA from message 4; or the UE can obtain a new TCI and a TA in the second step of the two-step random access, i. e., the UE can obtain a new TCI and a TA from message B. The UE can also enter a connected state to obtain a new TCI and a TA through signaling. After obtaining the new TCI and the new TA, the UE may continue to monitor the type-1 PDCCH or transmit data on the PDU.

It can be seen that, in this implementation, when the TCI or the TA is detected to be invalid, the UE may fall back to the random access process or the small data packet transmission, and obtain a new TCI and a new TA through an idle state message, such as message 2, message 4, or message B, or the UE may enter a connected state through random access, and obtain the new TCI and the new TA through signaling of the connected state.

In a possible implementation, the method further includes terminating monitoring the type-1 PDCCH if the TCI or the TA is determined to be invalid.

It can be seen that in this implementation, the UE can continue to initiate the random access process, or the UE can also enter the connected state. The UE obtains a new TCI and a new TA during the random access process or in the connected state. After obtaining the new TCI and the new TA, the UE may continue to monitor the type-1 PDCCH or transmit data on the PDU.

In a possible implementation, the method further includes terminating data transmission on the PUR, if the TCI or the TA is determined to be invalid.

It can be seen that in this implementation, the UE can continue to initiate the random access process, or the UE can also enter the connected state. The UE obtains a new TCI and a new TA during the random access process or in the connected state. After obtaining the new TCI and the new TA, the UE may continue to monitor the type-1 PDCCH or transmit data on the PDU.

In a possible implementation, the validity of the DCI is determined by: determining a signal strength of a reference signal, the reference signal being a signal quasi-co-located (QCLed) with the type-1 PDCCH or a signal associated with the PUR; determining that the TCI is valid, if the signal strength of the reference signal is less than or equal to a first threshold; and determining that the TCI is invalid, if the signal strength of the reference signal is greater than the first threshold.

The UE may determine a QCLed relationship through the TCI. The UE may determine an associated relationship through the TCI.

The reference signal is a signal QCLed with the type-1 PDCCH or a signal associated with the PUR. Two signals/channels being QCLed indicates that said two signals/channels have the same one or more large-scale properties, where the large-scale properties include delay spread, average delay, Doppler spread, Doppler shift, etc. In general, two signals/channels are QCLed, indicating that said two signals/channels use the same transmit and/or receive beams. After the signal strength of the reference signal is determined, when the signal strength of the reference signal is detected to be less than or equal to the first threshold, the TCI is determined to be valid; otherwise, when the signal strength of the reference signal is detected to be greater than the first threshold, the TCI is determined to be invalid.

It can be seen that, in this implementation, when the TCI is invalid, it indicates that a service beam needs to be modified and adjusted, and when the TCI is valid, it indicates that the service beam does not need to be modified and adjusted. Therefore, whether the service beam needs to be adjusted is determined according to the signal strength of the reference signal, so that the complexity is low and the efficiency is high.

In a possible implementation, the validity of the DCI is determined by: determining a signal strength of a reference signal, the reference signal being a signal QCLed with the type-1 PDCCH or a signal associated with the PUR; calculating a difference between the signal strength of the reference signal and a signal strength of a candidate reference signal; determining that the TCI is valid, if the difference is greater than or equal to a second threshold; and determining that the TCI is invalid, if the difference is less than the second threshold.

The reference signal, which is indicated by the TCI, is a signal QCLed with the type-1 PDCCH or a signal associated with the PUR. After the signal strength of the reference signal is determined, a difference between the signal strength of the reference signal and the signal strength of the candidate reference signal can be calculated. When the difference is detected to be greater than or equal to the second threshold, the TCI is determined to be valid; otherwise, when the difference is detected to be less than the second threshold, the TCI is determined to be invalid.

The candidate reference signal may be a candidate reference signal configured through signaling, and may also be a reference signal with a relatively great signal strength that is autonomously measured by the UE.

It can be seen that in this implementation, when the TCI is invalid, it indicates that the service beam needs to be modified and adjusted, and when the TCI is valid, it indicates that the service beam does not need to be modified and adjusted. Therefore, whether the service beam needs to be modified is determined according to the difference between the signal strength of the reference signal and the signal strength of the candidate reference signal, which indicates that there is a candidate reference signal having better signal quality, and the flexibility is higher.

In a possible implementation, the validity of the TA is determined by: determining a signal strength of a reference signal, the reference signal being a signal QCLed with the type-1 PDCCH or a signal associated with the PUR; calculating a change rate of the signal strength of the reference signal; determining that the TA is valid, if the change rate is greater than or equal to a third threshold; and determining that the TA is invalid, if the change rate is less than the third threshold.

The reference signal, which is indicated by the TCI, is a signal QCLed with the type-1 PDCCH or a signal associated with the PUR. After the signal strength of the reference signal is determined, a change rate of the reference signal can be calculated, and the change rate can be calculated by, for example, calculating a change magnitude of the signal strength in a preset duration, or dividing the change magnitude of the signal strength in the preset duration by the preset duration. When the change rate is detected to be greater than or equal to the third threshold, the TA is determined to be valid; otherwise, when the change rate is detected to be less than a third threshold, the TA is determined to be invalid.

It can be seen that, in this implementation, the change rate of the reference signal in the preset duration may reflect a moving rate of the UE, and when the moving rate is great, uplink synchronization most likely needs to be readjusted.

In a possible implementation, the reference signal is a synchronization signal block (SSB), and the signal strength of the reference signal is reference signal receiving power (RSPP) of the reference signal.

In the release-15 (REL-15) new radio (NR), a synchronization signal and a broadcast channel form a SSB, a beam sweeping function is introduced, and a primary synchronization signal (PSS), a secondary synchronization signal (SSS), and a physical broadcast channel form a SSB. Each SSB has a predetermined time-domain location, and the predetermined time-domain location may also be referred to as a candidate synchronization channel block. Multiple synchronization channel blocks form a synchronization signal burst, and multiple synchronization signal bursts form a synchronization signal burst set. Generally, a base station transmits a synchronization signal block by means of beam sweeping, i. e. the base station transmits the synchronization signal block at different time-domain locations via different beams, and accordingly, the UE can measure different beams and perceive on which beam the UE receives a strongest signal.

It can be seen that, in this implementation, the reference signal may be a synchronization signal block, and the signal strength of the reference signal is the RSPP.

In a possible implementation, the control resource set corresponding to the type-1 PDCCH is in an initial active downlink bandwidth part (BWP) or a BWP with index 0.

The control resource set is a set of frequency domain resources used by the PDCCH. When the control resource set corresponding to the type-1 PDCCH is in the initial active BWP or the BWP with index 0, the UE uses the type-1 PDCCH in an idle state or an inactive state.

It can be seen that in this implementation, when the UE is in the idle state, the UE uses resources of the initial active downlink BWP or the BWP with index 0. Therefore, when the control resource set corresponding to the type-1 PDCCH is in the initial active downlink BWP or the BWP with index 0, the UE does not need to adjust a radio frequency, so as to receive and transmit data outside the initial active downlink BWP or the BWP with index 0.

In a possible implementation, the PDU is in an initial active uplink BWP or a BWP with index 0.

It can be seen that, in this implementation, when the PDU is in the initial active uplink BWP or the BWP with index 0, the UE may not adjust the radio frequency, so as to transmit and receive data outside the initial active uplink BWP or the BWP with index 0.

In a possible implementation, before determining before determining the validity of the current TCI or the current TA, the method further includes: determining that an active BWP in a connected state includes an initial active BWP or a BWP with index 0 in a frequency domain resource.

When the active BWP of the UE in the connected state includes the initial active BWP or the BWP with index 0 in the frequency domain, the UE can use the type-1 PDCCH or the PDU in the idle state or the inactive state.

It can be seen that, in this implementation, when the active BWP in the connected state of the UE includes the initial active BWP in the frequency domain resource, and the base station may indicate the TCI and TA in the initial active downlink BWP to the UE in the connected state.

Figure 2:
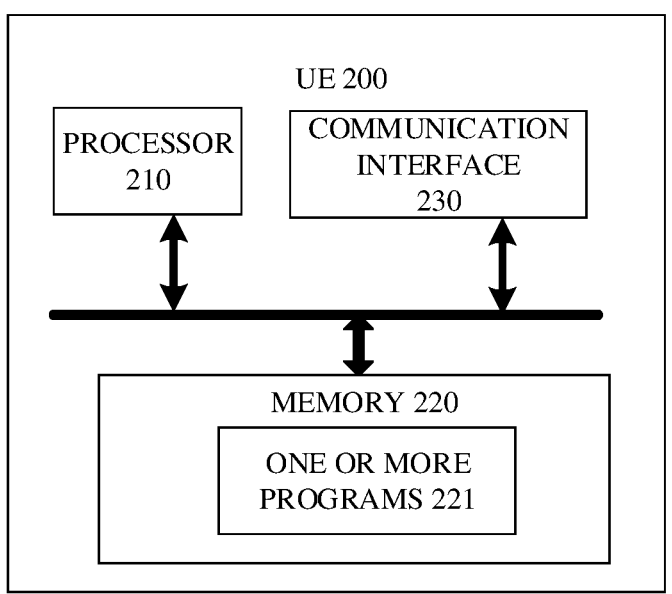
FIG. 2 is a schematic structural diagram of a user equipment (UE) provided in implementations of the disclosure.

Consistent with the above implementation, referring to FIG. 2, FIG. 2 is a schematic structural diagram of a UE provided in implementations of the disclosure. As illustrated in FIG. 2, the UE includes a processor 210, a memory 220, a communication interface 230, and one or more programs 221. The one or more programs 221 are stored in the memory 220 and configured to be executed by the processor 210. In implementations of the disclosure, the above programs include instructions configured to: determine validity of a TCI and/or a TA. In a possible implementation, the above programs include instructions configured to monitor a type-1 physical downlink control channel (PDCCH) or transmitting data on a PUR, if the TCI and the TA are determined to be valid.

It can be seen that, the method for data transmission processing and related apparatuses described in the implementations of the disclosure are applied to the UE, the UE determines validity of the TCI and the TA, and if the TCI and the TA are determined to be valid, the UE monitors the type-1 PDCCH or transmits data on the PUR. By classifying a PDCCH for a heartbeat traffic as the type-1 PDCCH, when the UE is detected to fall back to an idle state or an inactive state, whether to continue to monitor the type-1 PDCCH or to transmit data on the PUR is determined according to validity of TCI and the TA, which helps to ensure the reliability of data transmission of the heartbeat traffic.

In a possible implementation, the type-1 PDCCH is a PDCCH for a heartbeat traffic.

In a possible implementation, the above programs include instructions configured to fall back to a random access process or a small data packet transmission process, if the TCI or the TA is determined to be invalid.

In a possible implementation, the above programs include instructions configured to terminate monitoring the type-1 PDCCH, if the TCI or the TA is determined to be invalid.

In a possible implementation, the above programs include instructions configured to terminate data transmission on the PUR, if the TCI or the TA is determined to be invalid.

In a possible implementation, the above programs include instructions configured to: determine a signal strength of a reference signal, the reference signal being a signal quasi-co-located (QCLed) with the type-1 PDCCH or a signal associated with the PUR; determine that the TCI is valid, if the signal strength of the reference signal is less than or equal to a first threshold; and determine that the TCI is invalid, if the signal strength of the reference signal is greater than the first threshold.

In a possible implementation, the above programs include instructions configured to: determine a signal strength of a reference signal, the reference signal being a signal QCLed with the type-1 PDCCH or a signal associated with the PUR; calculate a difference between the signal strength of the reference signal and a signal strength of a candidate reference signal; determine that the TCI is valid, if the difference is greater than or equal to a second threshold; and determine that the TCI is invalid, if the difference is less than the second threshold.

In a possible implementation, the above programs include instructions configured to: determine a signal strength of a reference signal, the reference signal being a signal QCLed with the type-1 PDCCH or a signal associated with the PUR; calculate a change rate of the signal strength of the reference signal; determine that the TA is valid, if the change rate is greater than or equal to a third threshold; and determine that the TA is invalid, if the change rate is less than the third threshold.

In a possible implementation, the reference signal is a synchronization signal block (SSB), and the signal strength of the reference signal is reference signal receiving power (RSPP) of the reference signal.

In a possible implementation, a control resource set corresponding to the type-1 PDCCH is in an initial active downlink BWP or in a BWP with index 0.

In a possible implementation, the PUR is in an initial active uplink BWP or in a BWP with index 0.

In a possible implementation, before determining the validity of the current TCI or the current TA, the above programs include instructions configured to determine an active BWP in a connected state includes an initial active BWP or a BWP with index 0 in a frequency domain resource.

The foregoing solutions of the implementations of the disclosure are mainly introduced from the viewpoint of execution of the method side. It can be understood that, in order to implement the above functions, the UE includes hardware structures and/or software modules for performing the respective functions. Those skilled in the art should easily recognize that, in combination with the units and algorithmic operations of various examples illustrated in the implementations provided herein, the disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the illustrated functions for each particular application, but such implementations should not be considered as beyond the scope of the disclosure.

According to the implementations of the disclosure, division of functional units may be performed for the UE in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the implementations of the disclosure is schematic, and is merely a logical function division, and there may be other division manners in actual implementations.

Figure 3:
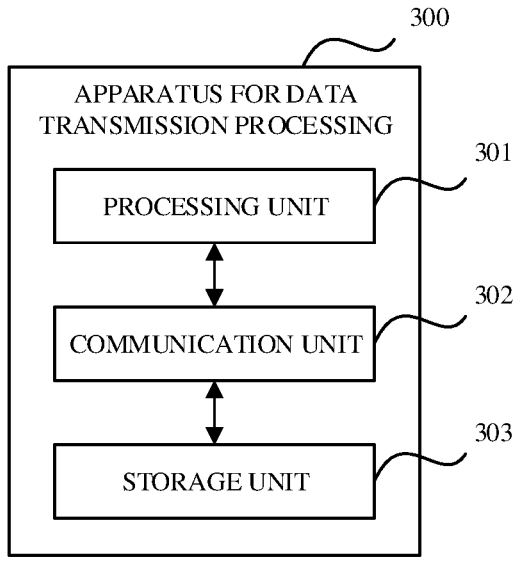
FIG. 3 is a schematic block diagram of functional units of an apparatus for data transmission processing provided in implementations of the disclosure.

FIG. 3 is a schematic block diagram of functional units of an apparatus 300 for data transmission processing provided in implementations of the disclosure. The apparatus 300 for data transmission processing is applied to a UE and includes a communication unit 302 and a processing unit 301. The processing unit 301 is configured to: determine validity of a TCI and/or a TA. In a possible implementation, the processing unit 301 is configured to monitor a type-1 PDCCH or transmitting data on a PUR, if the TCI and the TA are determined to be valid.

It can be seen that, the method for data transmission processing and related apparatuses described in the implementations of the disclosure are applied to the UE, the UE determines validity of the TCI and the TA, and if the TCI and the TA are determined to be valid, the UE monitors the type-1 PDCCH or transmits data on the PUR. By classifying a PDCCH for a heartbeat traffic as the type-1 PDCCH, when the UE is detected to fall back to an idle state or an inactive state, whether to continue to monitor the type-1 PDCCH or to transmit data on the PUR is determined according to validity of TCI and the TA, which helps to ensure the reliability of data transmission of the heartbeat traffic.

In a possible implementation, the type-1 PDCCH is a PDCCH for a heartbeat traffic.

In a possible implementation, the processing unit 301 is specifically configured to falling back to a random access process or a small data packet transmission process, if the TCI or the TA is determined to be invalid.

In a possible implementation, the processing unit 301 is specifically configured to terminate monitoring the type-1 PDCCH, if the TCI or the TA is determined to be invalid.

In a possible implementation, the processing unit 301 is specifically configured to terminate data transmission on the PUR, if the TCI or the TA is determined to be invalid.

In a possible implementation, the processing unit 301 is specifically configured to: determine a signal strength of a reference signal, the reference signal being a signal quasi-co-located (QCLed) with the type-1 PDCCH or a signal associated with the PUR; determine that the TCI is valid, if the signal strength of the reference signal is less than or equal to a first threshold; and determine that the TCI is invalid, if the signal strength of the reference signal is greater than the first threshold.

In a possible implementation, the processing unit 301 is specifically configured to: determine a signal strength of a reference signal, the reference signal being a signal QCLed with the type-1 PDCCH or a signal associated with the PUR; calculating a difference between the signal strength of the reference signal and a signal strength of a candidate reference signal; determine that the TCI is valid, if the difference is greater than or equal to a second threshold; and determine that the TCI is invalid, if the difference is less than the second threshold.

In a possible implementation, the processing unit 301 is specifically configured to: determine a signal strength of a reference signal, the reference signal being a signal QCLed with the type-1 PDCCH or a signal associated with the PUR; calculate a change rate of the signal strength of the reference signal; determine that the TA is valid, if the change rate is greater than or equal to a third threshold; and determine that the TA is invalid, if the change rate is less than the third threshold.

In a possible implementation, the reference signal is a synchronization signal block (SSB), and the signal strength of the reference signal is reference signal receiving power (RSPP) of the reference signal.

In a possible implementation, a control resource set corresponding to the type-1 PDCCH is in an initial active downlink BWP or in a BWP with index 0.

In a possible implementation, the PUR is in an initial active uplink BWP or in a BWP with index 0.

In a possible implementation, before determining the validity of the current TCI or the current TA, the processing unit 301 is specifically configured to determine an active BWP in a connected state includes an initial active BWP or a BWP with index 0 in a frequency domain resource.

The electronic device may further include a storage unit 303, where the processing unit 301 and the communication unit 302 may be a controller or a processor, and the storage unit 303 may be a memory.

It may be understood that functions of program modules of the apparatus for data transmission processing in implementations may be specifically implemented according to the methods in the foregoing method implementations. For a specific implementation process, reference can be made to the related description of the foregoing method implementations, which will not be repeated herein.

A non-transitory computer-readable storage medium is further provided in implementations of the disclosure. The computer storage medium stores computer programs for electronic data interchange (EDI), where the computer programs are operable with a computer to perform part or all of the operations of any one of the methods described in the foregoing method implementations. The computer includes a UE.

A computer program product is further provided in implementations of the disclosure. The computer program product includes a non-transitory computer-readable storage medium that stores computer programs. The computer programs are operable with a computer to perform part or all of the operations of any one of the methods described in the foregoing method implementations. The computer program product may be a software installation package. The computer includes a UE.

It is to be noted that for the sake of simplicity, the foregoing method implementations are described as a series of action combinations. However, it will be appreciated by those skilled in the art that the disclosure is not limited by the sequence of actions described. According to the disclosure, some operations may be performed in other orders or simultaneously. Besides, it will be appreciated by those skilled in the art that the implementations described in the specification are preferred implementations, and the actions and modules involved are not necessarily essential to the disclosure.

In the foregoing implementations, the description of each implementation has its own emphasis. For the parts not described in detail in one implementation, reference may be made to related descriptions in other implementations.

In several implementations provided in the disclosure, it will be appreciated that the apparatuses disclosed may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Units illustrated as separated parts may or may not be physically separated. Components or parts displayed as units may or may not be physical units, and may reside at one location or may be distributed to multiple network units. Part of or all of the units may be selectively adopted according to practical needs to achieve desired objectives of the solutions of implementations.

In addition, various functional units described in various implementations of the disclosure may be integrated into one processing unit or may be presented as a number of physically separated units, and two or more units may be integrated into one unit. The integrated unit may be implemented by a form of hardware or a software functional unit.

If the integrated units are implemented as software functional units and sold or used as standalone products, they may be stored in a computer-readable memory. According to such an understanding, the essential technical solution, or the portion that contributes to the related art, or all or part of the technical solution of the disclosure may be expressed as software products. The computer software products can be stored in a memory and may include multiple instructions that, when executed, can cause a computer device (e.g., a personal computer, a server, a network device, etc.) to execute all or part of operations of the methods described in various implementations of the disclosure. The above memory may include various kinds of media that can store program codes, such as a universal serial bus (USB) flash disk, a read-only memory (ROM), a random access memory (RAM), a mobile hard disc, a magnetic disk, or an optical disk.

It will be understood by those of ordinary skill in the art that all or part of the operations of the various methods in the implementations described above may be accomplished by means of a program to instruct associated hardware, and the program may be stored in a computer-readable memory, which may include a flash disk, an ROM, an RAM, a magnetic disk, or an optical disk.

The above implementations in the disclosure are introduced in detail. Principles and implementation manners of the disclosure are elaborated with specific implementations herein. The illustration of implementations above is only used to help understanding of methods and core ideas of the disclosure. At the same time, for those of ordinary skill in the art, according to ideas of the disclosure, there will be changes in the specific implementation manners and application scope. In summary, contents of this specification should not be understood as limitation on the disclosure.

What is claimed is:

1. A method for data transmission processing, comprising:
determining validity of a transmission configuration indicator (TCI) and/or a timing advance (TA), wherein the validity of the TCI is determined by:
determining a signal strength of a reference signal, the reference signal being a signal quasi-co-located (QCLed) with a type-1 physical downlink control channel (PDCCH) or a signal associated with a predefined uplink resource (PUR); determining that the TCI is valid, if the signal strength of the reference signal is less than or equal to a first threshold; and determining that the TCI is invalid, if the signal strength of the reference signal is greater than the first threshold; or
determining a signal strength of a reference signal, the reference signal being a signal QCLed with the type-1 PDCCH or a signal associated with the PUR; calculating a difference between the signal strength of the reference signal and a signal strength of a candidate reference signal; determining that the TCI is valid, if the difference is greater than or equal to a second threshold; and determining that the TCI is invalid, if the difference is less than the second threshold.

2. The method according to claim 1, further comprising:
falling back to a random access process or a small data packet transmission process, if the TCI or the TA is determined to be invalid.

3. The method according to claim 1, further comprising: terminating monitoring the type-1 PDCCH, if the TCI or the TA is determined to be invalid.

4. The method according to claim 1, further comprising: terminating data transmission on the PUR, if the TCI or the TA is determined to be invalid.

5. The method according to claim 1, wherein the validity of the TA is determined by:

determining a signal strength of a reference signal, the reference signal being a signal QCLed with the type-1 PDCCH or a signal associated with the PUR;
calculating a change rate of the signal strength of the reference signal;
determining that the TA is valid, if the change rate is greater than or equal to a third threshold; and
determining that the TA is invalid, if the change rate is less than the third threshold.

6. The method according to claim 1, wherein the reference signal is a synchronization signal block (SSB), and the signal strength of the reference signal is reference signal receiving power (RSPP) of the reference signal.

7. The method according to claim 1, wherein a control resource set corresponding to the type-1 PDCCH is in an initial active downlink bandwidth part (BWP) or in a BWP with index 0.

8. The method according to claim 1, wherein the PUR is in an initial active uplink BWP or in a BWP with index 0.

9. The method according to claim 1, wherein before determining the validity of a current TCI or a current TA, the method further comprises:
determining that an active BWP in a connected state comprises an initial active BWP or a BWP with index 0 in a frequency domain resource.

10. A user equipment (UE), comprising a processor, a memory, a communication interface, and one or more programs, wherein the one or more programs are stored in the memory and configured to be executed by the processor, and the one or more programs comprise instructions configured to:
determine validity of a transmission configuration indicator (TCI) and/or a timing advance (TA),
wherein in terms of determining the validity of the TA, the one or more programs comprise instructions configured to:
determine a signal strength of a reference signal, the reference signal being a signal QCLed with a type-1 physical downlink control channel (PDCCH) or a signal associated with a predefined uplink resource (PUR);
calculate a change rate of the signal strength of the reference signal;
determine that the TA is valid, if the change rate is greater than or equal to a third threshold; and
determine that the TA is invalid, if the change rate is less than the third threshold.

11. A non-transitory computer-readable storage medium storing computer programs for electronic data interchange (EDI), wherein the computer programs are operable with a computer to:
determine validity of a transmission configuration indicator (TCI) and/or a timing advance (TA),
wherein in terms of determining the validity of the TCI, the computer programs are operable with the computer to:
determine a signal strength of a reference signal, the reference signal being a signal quasi-co-located (QCLed) with a type-1 physical downlink control channel (PDCCH) or a signal associated with a predefined uplink resource (PUR); determine that the TCI is valid, if the signal strength of the reference signal is less than or equal to a first threshold; and determine that the TCI is invalid, if the signal strength of the reference signal is greater than the first threshold; or determine a signal strength of a reference signal, the reference signal being a signal QCLed with the type-1 PDCCH or a signal associated with the PUR; calculating a difference between the signal strength of the reference signal and a signal strength of a candidate reference signal; determine that the TCI is valid, if the difference is greater than or equal to a second threshold; and determine that the TCI is invalid, if the difference is less than the second threshold.

12. The method according to claim 1, further comprising: monitoring the type-1 PDCCH or transmitting data on the PUR, if the TCI and the TA are determined to be valid.

13. The method according to claim 5, wherein the reference signal is an SSB, and the signal strength of the reference signal is RSPP of the reference signal.

14. The UE according to claim 10, wherein the one or more programs further comprise instructions configured to:

monitor the type-1 PDCCH or transmitting data on the PUR, if the TCI and the TA are determined to be valid.

15. The UE according to claim 10, wherein the one or more programs further comprise instructions configured to:

fall back to a random access process or a small data packet transmission process, if the TCI or the TA is determined to be invalid.

16. The non-transitory according to claim 11, wherein the computer programs are operable with the computer to:

monitor the type-1 PDCCH or transmitting data on the PUR, if the TCI and the TA are determined to be valid.

17. The non-transitory according to claim 11, wherein the computer programs are operable with the computer to:

fall back to a random access process or a small data packet transmission process, if the TCI or the TA is determined to be invalid.

* * * * *